(12) United States Patent
Ellis

(10) Patent No.: US 6,678,110 B2
(45) Date of Patent: Jan. 13, 2004

(54) ROBUST SERVO DEMODULATION FILTERING METHOD

(75) Inventor: Timothy Francis Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 404 days.

(21) Appl. No.: 09/823,655

(22) Filed: Mar. 30, 2001

(65) Prior Publication Data

US 2002/0141105 A1 Oct. 3, 2002

Related U.S. Application Data

(60) Provisional application No. 60/251,362, filed on Dec. 5, 2000.

(51) Int. Cl.[7] ............................................. G11B 5/596
(52) U.S. Cl. ...................... 360/77.08; 360/29; 360/30; 360/39
(58) Field of Search .............................. 360/29, 25, 31, 360/46, 39, 66, 77.08, 75

(56) References Cited

U.S. PATENT DOCUMENTS

| | | | |
|---|---|---|---|
| 5,233,482 A | * 8/1993 | Galbraith et al. | ............. 360/46 |
| 5,576,906 A | 11/1996 | Fisher et al. | |
| 5,801,895 A | 9/1998 | Abramovich | |
| 5,801,896 A | * 9/1998 | Freitas | ..................... 360/77.08 |
| 5,818,659 A | 10/1998 | Cheung et al. | |
| 5,854,714 A | 12/1998 | Reed et al. | |
| 5,949,832 A | 9/1999 | Liebetreu et al. | |
| 6,002,542 A | 12/1999 | Bruccoleri et al. | |
| 6,005,726 A | * 12/1999 | Tsunoda | ..................... 360/46 |
| 6,108,153 A | 8/2000 | Glover | |
| 6,181,505 B1 | 1/2001 | Sacks et al. | |

* cited by examiner

Primary Examiner—David Hudspeth
Assistant Examiner—K. Wong
(74) Attorney, Agent, or Firm—Derek J. Berger

(57) ABSTRACT

A robust and efficient method for determining the location of a transducer head in a mass storage system. A position-indicative signal characterized by a fundamental frequency F is received from a data path including the transducer head. Energy in the signal at frequencies smaller than F/10 is substantially attenuated by a special filter, which may be an analog or digital differentiator. A sequence of bits indicative of the transducer head position indicator is then extracted from the digitized, filtered signal.

27 Claims, 6 Drawing Sheets

ROBUST SERVO DEMODULATION FILTERING METHOD

RELATED APPLICATIONS

This application claims the benefit of U.S. Provisional Application No. 60/251,362 filed on Dec. 5, 2000.

FIELD OF THE INVENTION

The present invention relates to methods for determining a transducer head position in a mass storage system, and more particular to systems for accurately interpreting positional information received from transducer heads.

BACKGROUND OF THE INVENTION

Information handling systems have undergone explosive growth over the past several years. New technologies are allowing today's common components to outperform state-of-the-art components of five years ago. In disc drives, for example, areal density has doubled each year for the past several years. This has been made possible, in part, by the development of better transducers than previously existed. Not surprisingly, most modern transducers are highly sophisticated and temperamental.

Most modern disc drives include one or more rigid discs that are coated with a magnetizable medium and mounted on the hub of a spindle motor for rotation at a constant high speed. Information is stored on the discs in many thousands of concentric circular tracks by an array of transducers mounted to a radial actuator for movement of the transducers relative to the discs. Typically, such radial actuators employ a voice coil motor to position the transducers with respect to the disc surfaces. Sliders carrying the transducers are mounted via flexures at the ends of arms which project radially outward from a rotary actuator body. The actuator body pivots about a shaft mounted to the housing at a position closely adjacent the outer extreme of the discs. The pivot shaft is parallel with the axis of rotation of the spindle motor and the discs, so that the transducers each move in a respective plane parallel with the surfaces of the discs.

The actuator voice coil motor includes a coil mounted on the side of the actuator body opposite the transducer arms so as to be immersed in the magnetic field of an array of permanent magnets. When controlled DC current is passed through the coil, an electromagnetic field is set up which interacts with the magnetic field of the magnets and causes the coil to move in accordance with the well-known Lorenz relationship. As the coil moves relative to the magnets, the actuator body pivots about the pivot shaft and the transducers are moved across the disc surfaces.

Typically, the transducers are supported over the discs by actuator slider assemblies which include air-bearing surfaces designed to interact with a thin layer of moving air generated by the rotation of the discs, so that the transducers are said to "fly" over the disc surfaces. Generally, the transducers write data to a selected data track on the disc surface by selectively magnetizing portions of the data track through the application of a time-varying write current to the transducer. In order to subsequently read back the data stored on the data track, the transducer detects flux transitions in the magnetic fields of data track and converts these to a signal which is decoded by read channel circuitry and servo channel circuitry.

Transducers in other data storage systems operate differently, but many are similarly vulnerable to mechanical disturbances or other noise sources. Existing methods of determining a transducer position rely upon retries and error correction methods that may not be effective alone. Without accurate position detection, accurate positioning is often impossible. These noise sources can thus cause performance losses and user data recovery failures. Thus, there is a need for more effective approaches to determining transducer head position accurately.

SUMMARY OF THE INVENTION

The present invention is a robust and efficient method for determining the location of a transducer head in a mass storage system. A position-indicative signal characterized by a fundamental frequency F is received from a data path including the transducer head. Energy in the signal at frequencies smaller than F/10 is substantially attenuated by a special filter, which may be an analog or digital differentiator. (As used herein, an attenuation is "substantial" if it reduces a signal component by several decibels or more.) A sequence of bits indicative of the transducer head position is then extracted from the digitized, filtered signal.

Other features and advantages of the present invention will become apparent upon a review of the following figures and their accompanying description.

DETAILED DESCRIPTION

Numerous aspects of mass storage system design that are not a part of the present invention, or are well known in the art, are omitted for brevity. These include specifics of conventional servo channel operation, phase-locked loops, sampling, Viterbi detection, and hardware for positioning. For further information, the reader is referred to U.S. Pat. No. 6,181,505 entitled "Synchronous Digital Demodulator with Integrated Read and Servo Channels" issued Jan. 30, 2001 to Alexei H. Sacks et al. and assigned to the assignee of the present invention.

Although each of the examples below shows more than enough detail to allow those skilled in the art to practice the present invention, subject matter regarded as the invention is broader than any single example below. The scope of the present invention is distinctly defined, however, in the claims at the end of this document.

Figure 1:
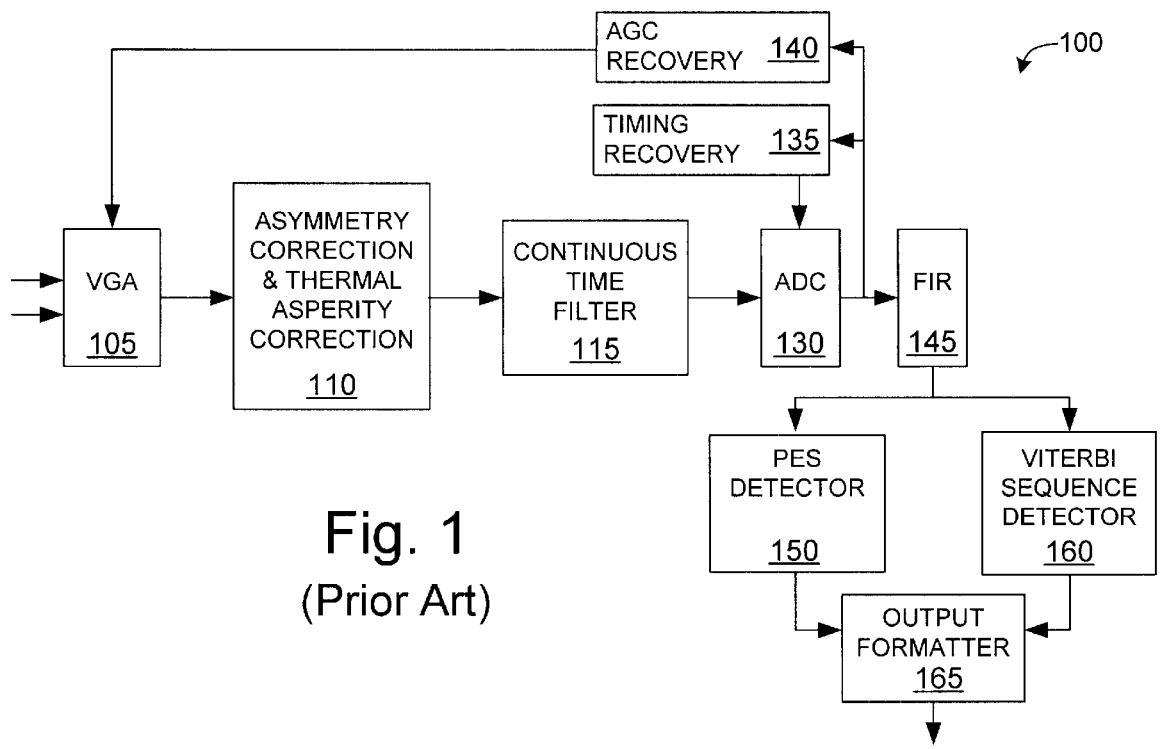
FIG. 1 shows a block diagram of a prior art servo demodulator channel.

FIG. 1 shows a block diagram of a typical prior art servo demodulator channel 100. The variable gain amplifier (VGA) 105 is used for the automatic gain control (AGC) loop to attempt to keep the signal level relatively constant. Asymmetry correction and thermal asperity detection circuits 110 are included to try to make the system robust to these events. This block 110 is shown before the sampler 130 (an analog to digital converter) in this case but it is sometimes located after the sampler 130. The continuous time filter 115 is used for noise limiting and anti-aliasing. It is usually configured as a $4^{th}$ to $6^{th}$ order lowpass filter. If boost capability is included, the filter then plays a role in equalization of the signal to the desired response target. Feedback circuits for timing recovery and AGC/gain recovery 135,140 receive a sampled signal output from the sampler 130. The finite impulse response (FIR) filter 145 is optionally downstream from the sampler 130. The FIR filter 145 is used for signal equalization to achieve the target pulse shape for the Viterbi sequence detector 160, which detects servo address mark and servo Gray code (coarse position). Alternatively, a digital "matched filter" detector or some other type of sequence detector known in the art may be used. In any event, such detectors conventionally compare a received shape against a "target" pulse shape to extract digital information in the signals they receive. The Position Error Sense (PES) detector 150 is used to demodulate the fine position bursts written into the servo area. These bursts can be a null pattern, split burst pattern, or other similar burst pattern known in the art. The detection method can be either synchronous or asynchronous. A synchronous digital demodulation method in a data channel for a null pattern is exemplified in U.S. Pat. No. 5,576,906 entitled "Synchronous Detection of Concurrent Servo Bursts for Fine Positioning Head Position in a Disk Drive," issued to Kevin D. Fisher et al. on Nov. 19, 1996.

Figure 2:
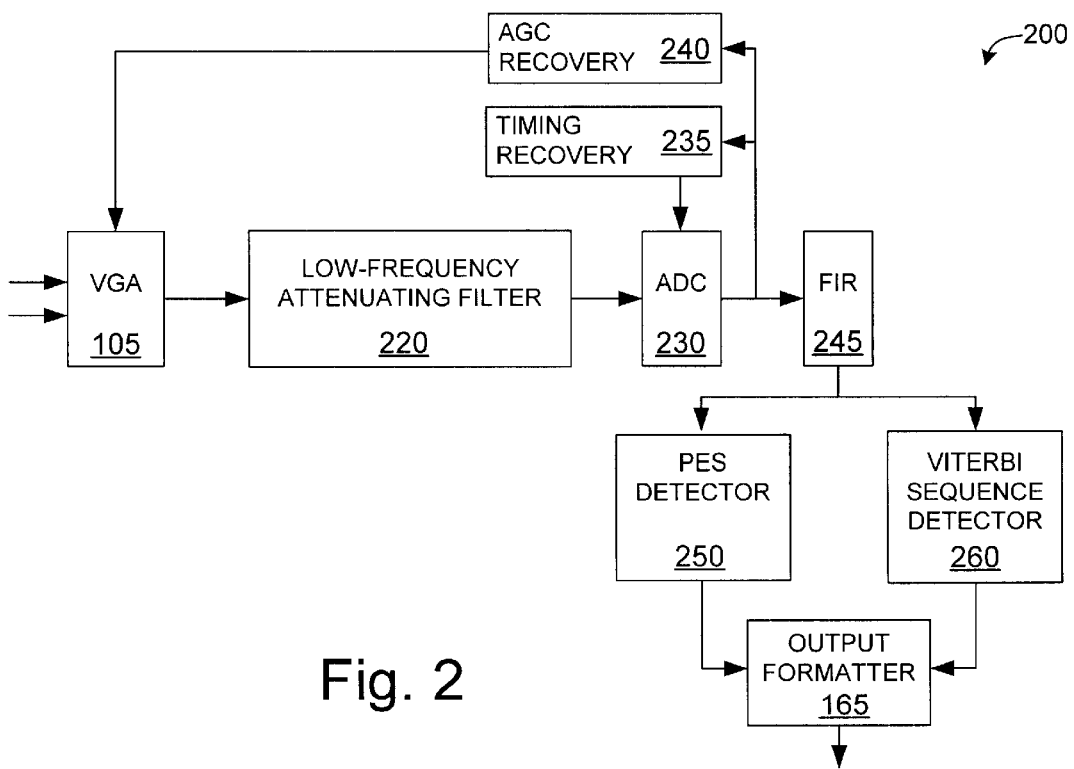
FIG. 2 shows a block diagram of a servo demodulator channel adapted for performing a method of the present invention.

FIG. 2 shows a block diagram of a servo demodulator channel 200 suitable for performing a method of the present invention. The continuous time filter 115 and correction block 110 for asymmetry and thermal asperities is replaced with a filter 220 adapted to attenuate low frequency energy received from the VGA 105. It will be understood by those of skill in mass storage system technologies that similarly adapted versions of other circuit blocks will be appropriate for implementing certain method embodiments described below. In FIG. 2, this is denoted by the inclusion of modified versions of blocks representing the ADC 230, timing recovery 235, AGC recovery 240, FIR filter 245, PES detector 250, and Viterbi sequence detector 260.

In an alternative implementation of the present inventive method, a bandpass filter, differentiator, or similar filter that substantially attenuates frequencies below the servo fundamental frequency is included in the FIR filter 245 (i.e. substantially attenuating the signal at all frequencies smaller than F/10). (Removing low frequency noise with the FIR filter 245 may be less desirable than with the low-frequency-attenuating filter 220, however, because it does not eliminate any noise from the circuits for timing recovery or AGC recovery.)

Those of skill in mass storage system technologies will recognize that numerous variations on the depicted servo demodulator channel may implement the present invention. These include variations in the order in which operations are performed upon a received signal. For example, an analog FIR filter (not shown) could replace the depicted digital FIR filter 245 if placed upstream of the sampler 230. Timing and AGC recovery circuits 235,240 can receive their inputs from such an analog FIR filter or from the FIR filter 245 shown. Many such configurations can derive significant advantages from the present invention.

Figure 3:
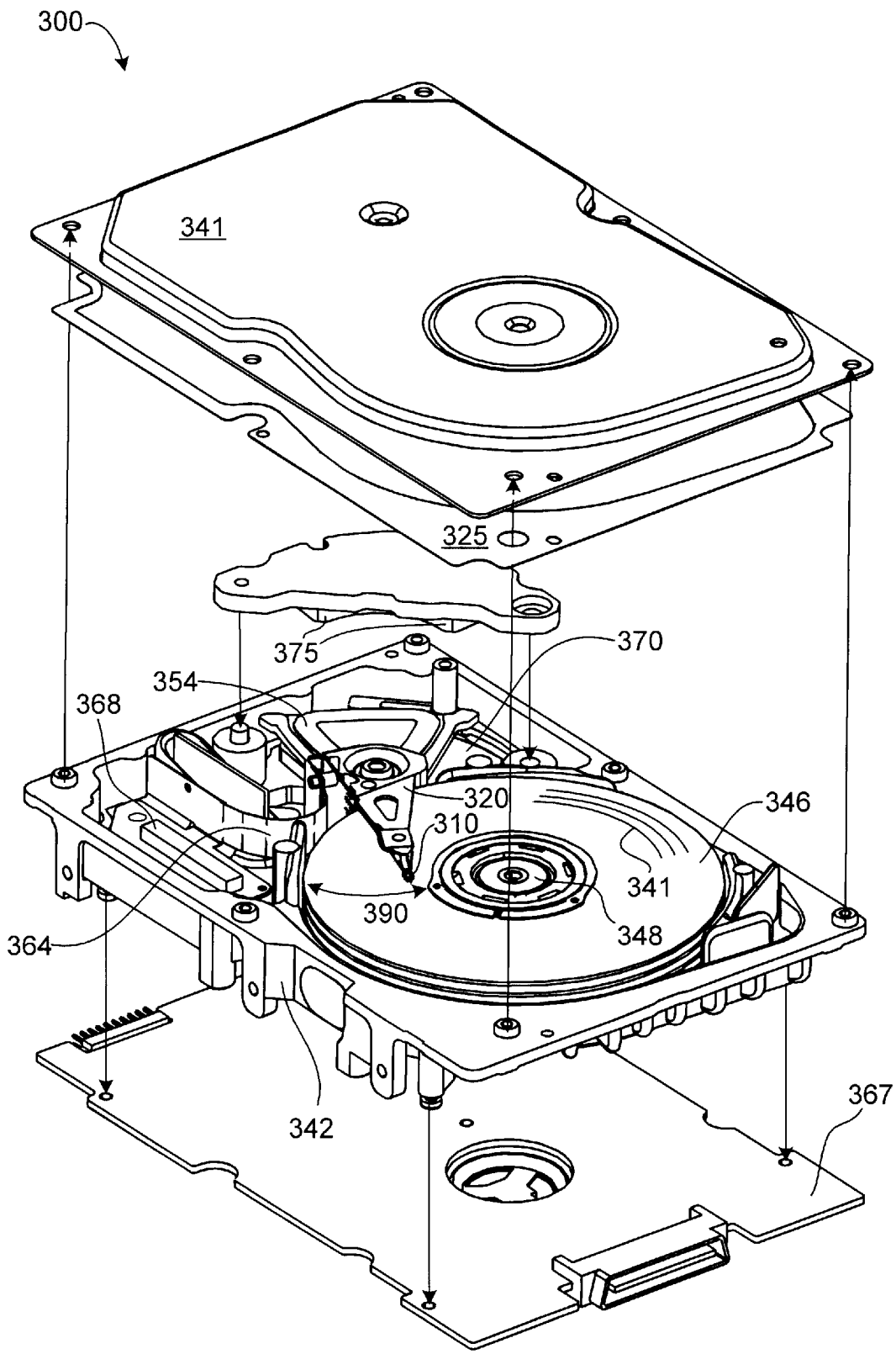
FIG. 3 depicts the mechanical configuration of a disc drive implementing the present invention.

For example, FIG. 3 depicts the mechanical configuration of a disc drive 300 implementing the present invention. Disc drive 300 includes an actuator assembly 320 and a stack of discs 346 supported on a spindle hub 348 each rotatably mounted over a baseplate 342. Top cover 341 and baseplate 342 both engage gasket 325 to form a sealed chamber that maintains a clean internal environment. Each disc 346 has two horizontal surfaces. Several transducers 310 are mounted on actuator assembly 320. As depicted, transducers 310 are loaded adjacent to annular data tracks 341 of discs 346. The actuator assembly 320 is adapted for pivotal motion under control of a voice coil motor (VCM) comprising voice coil 354 and voice coil magnets 370,375 to controllably move transducers 310 each to a respective desired track 341 along an arcuate path 390. Arcuate path 390 crosses several thousand data tracks 341 between the two extremes of its stroke. As the discs 346 rotate, transducers 310 transmit electrical signals related to the strength of the magnetic field adjacent each moving surface of each disc 346. The signals carry positional and user data via flex circuit 364 and connector 368 to electronic circuitry on the controller board 367.

Figure 4:
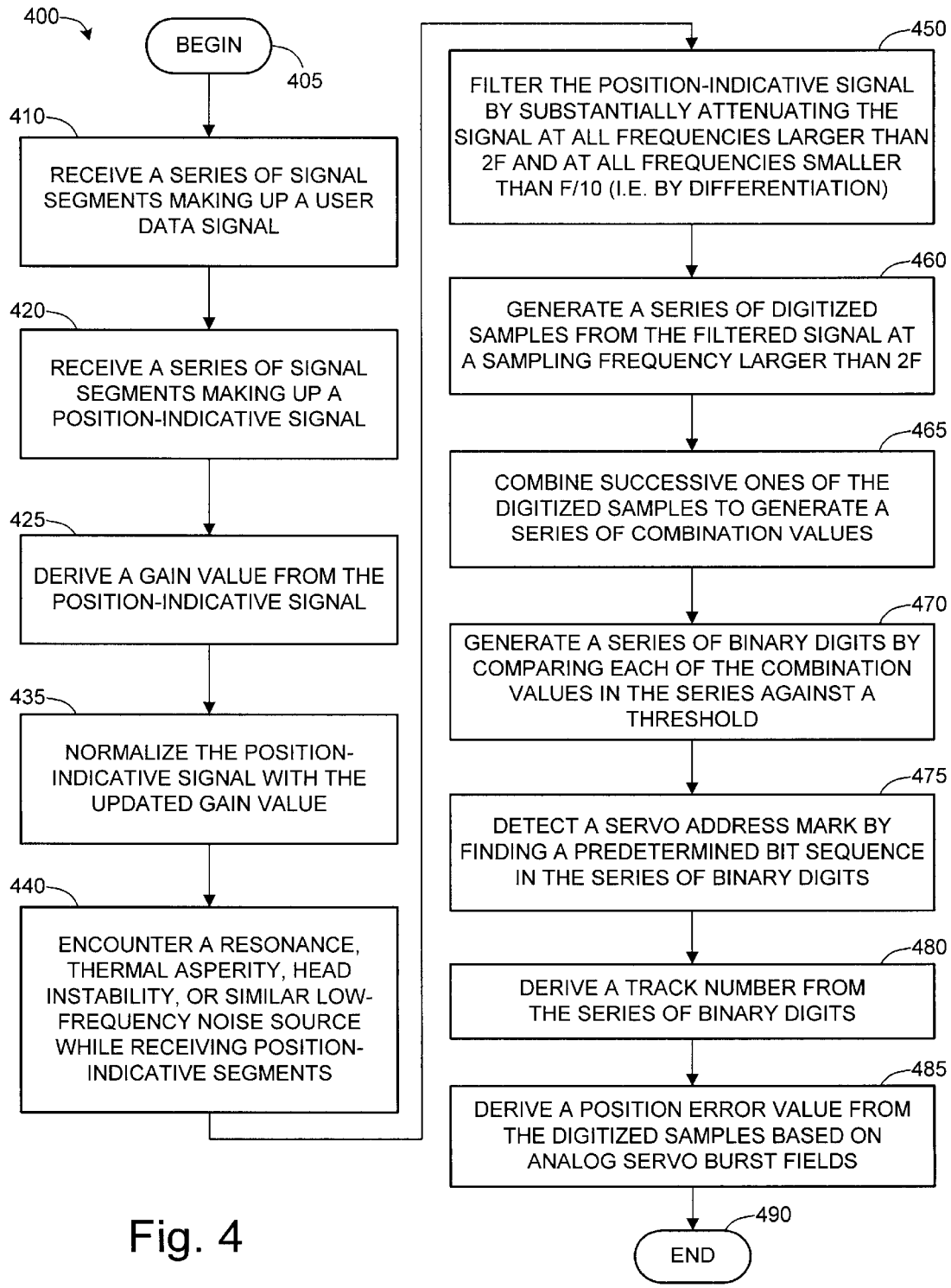
FIG. 4 shows a specific method of the present invention.

FIG. 4 shows a method of the present invention comprising step 405 through 490. A predetermined filter (such as low-frequency attenuating filter 220 of FIG. 2) is used to process signal segments received as user data 410 and then as position-indicative data 420. The present invention can optionally be implemented so as to avoid switching special filtering on and off at each servo sector. Alternatively, where filter parameters are adjusted at the beginning of a servo sector so as to produce long transients in a conventional system, the present invention will reduce the transients because such transients normally have a large fraction of their energy at frequencies substantially below the servo fundamental frequency.

A gain value is derived from the position-indicative data 425 and then used in normalizing the position-indicative data in a conventional manner as performed by variable gain amplifier (VGA) circuitry 105 (of FIG. 1). If any of several low-frequency noise sources are encountered 440, the position indications can still be extracted. This is because all frequencies below F/10 in the position-indicative signal are substantially attenuated, as are all frequencies larger than 2F at step 450. (It should be noted that a differentiator is a preferred circuit element for implement the recited low-frequency attenuation because of its uncomplicated effect upon the phase of a position-indicative signal.)

From the filtered signal, a series of sampled & digitized samples is generated at a frequency larger than twice the fundamental frequency 460. To avoid aliasing, the sampling frequency should be set at more than twice the filter cutoff frequency. Successive ones of the digitized samples are added, averaged, or otherwise arithmetically combined to generate a series of combination values 465 which are then each compared against a threshold to generate a binary digit series 470. A servo address mark is detected within the binary digit series as a predefined sequence 475 such as 5 to 10 consecutive zeroes. Another set of the binary digits (derived from Gray code) is used to generate a track number 480, and a subsequent set of the digitized samples (derived from servo bursts) is used to derive a position error signal (PES) value 485. The present invention is believed to have a significant benefit when applied to improve the filtering of an otherwise conventional PES burst decoder. Because PES bursts essentially contain only analog information, digital data validation filters are not well suited for removing noise in signals derived from PES bursts.

Figure 5:
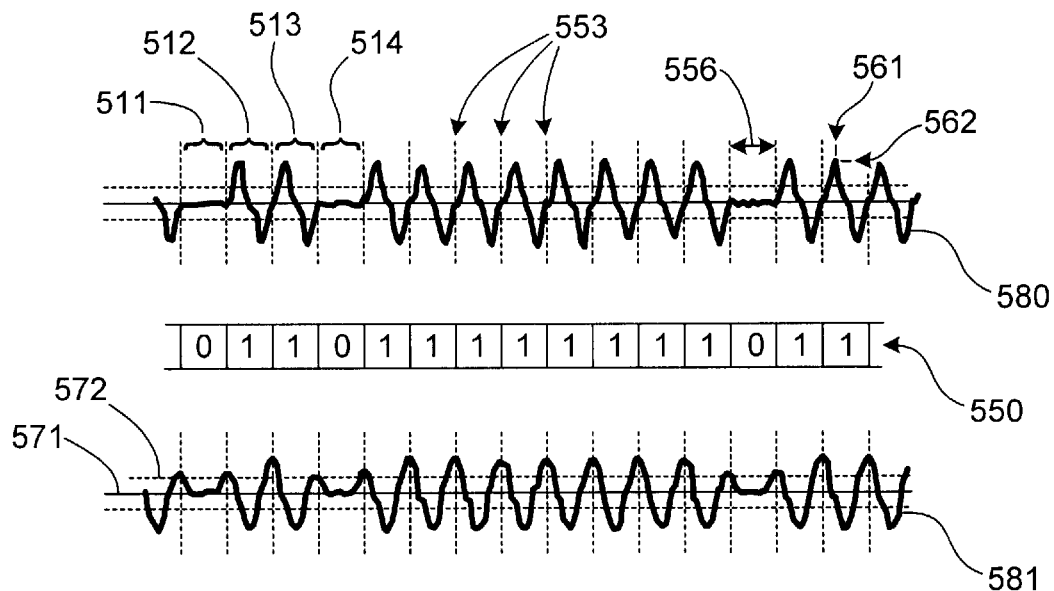
FIG. 5 shows analog signals respectively entering and leaving a filter of the present invention.

FIG. 5 shows time domain signals 580,581 respectively entering and leaving a filter of the present invention. The entering signal 580 contains a bit stream 550 encoded so that 1's and 0's appear as dibits 512,513 and flat segments 511,514. It will be recognized that other encoding systems for use with a mass storage medium, some of which are known in the art, are useable with the present invention. Divisions 553 between successive encoded bits are located with a phase-locked loop within ADC 230, which determines sample times 561 at which sample values 562 are measured. The sample values 562 are then used to determine a value for each binary bit in the stream 550.

Decoding systems are known in the art for attempting to extract a bit stream (such as 550) from an amplitude normalized signal (such as 580 or the output of VGA 105). It will be recognized that 1's and 0's are readily distinguishable visually in the entering signal 580. It will also be recognized that 1's and 0's take a slightly different shape as they appear in filtered signal 581, but that 1's and 0's are still readily distinguished there, either visually or by a decoder. Detailed methods of adapting sampling rates, sampling phase lags, baselines 571, computations and thresholds 572 for decoding a filtered signal (such as 581) into a bit stream (such as 550) are beyond the scope of this specification. What is important for present purposes is to note that most of the meaningful information to be extracted from a signal containing digital servo information (e.g. entering signal 580) is in the energy near the servo fundamental frequency. (The servo fundamental frequency is the reciprocal of the nominal period (such as 556) corresponding with each bit in an entering signal derived from a servo field of a mass storage medium.)

Figure 6:
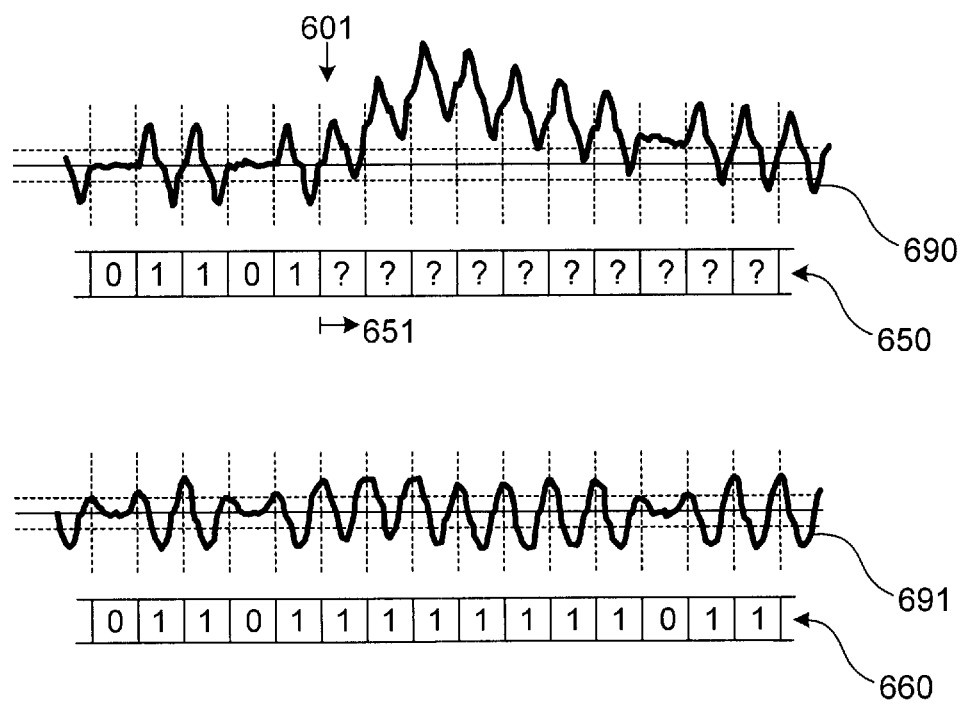
FIG. 6 shows similar analog signals entering and leaving a filter of the present invention, to show how the present filter removes noise introduced into the signal by a thermal asperity.

To illustrate this, FIG. 6 shows similar time domain signals 690,691 respectively entering and leaving a filter of the present invention. It is visually apparent that entering signal 690 contains a bit stream similar to the bit stream 550 of FIG. 5. Entering signal 690 cannot be decoded accurately by conventional means, though, because it contains substantial noise for several bits following disturbance event 601 (i.e. colliding with a thermal asperity on the mass storage medium). As a result, an attempt to decode it by conventional means would produce an unpredictable bit stream 650 containing a portion 651 likely to contain erroneous bits.

The filtered signal 691 effectively removes the noise while preserving the information content of the entering signal 690. For this reason, the filtered signal 691 derived from the noise-containing entering signal 691 of FIG. 6, is effectively identical to the filtered signal 581 derived from the quiet entering signal 580 of FIG. 5. FIGS. 5 & 6 illustrate how well an analog filter of the present invention blocks noise induced by a thermal asperity or similar mechanical disturbance in a mass storage system.

Figure 7:
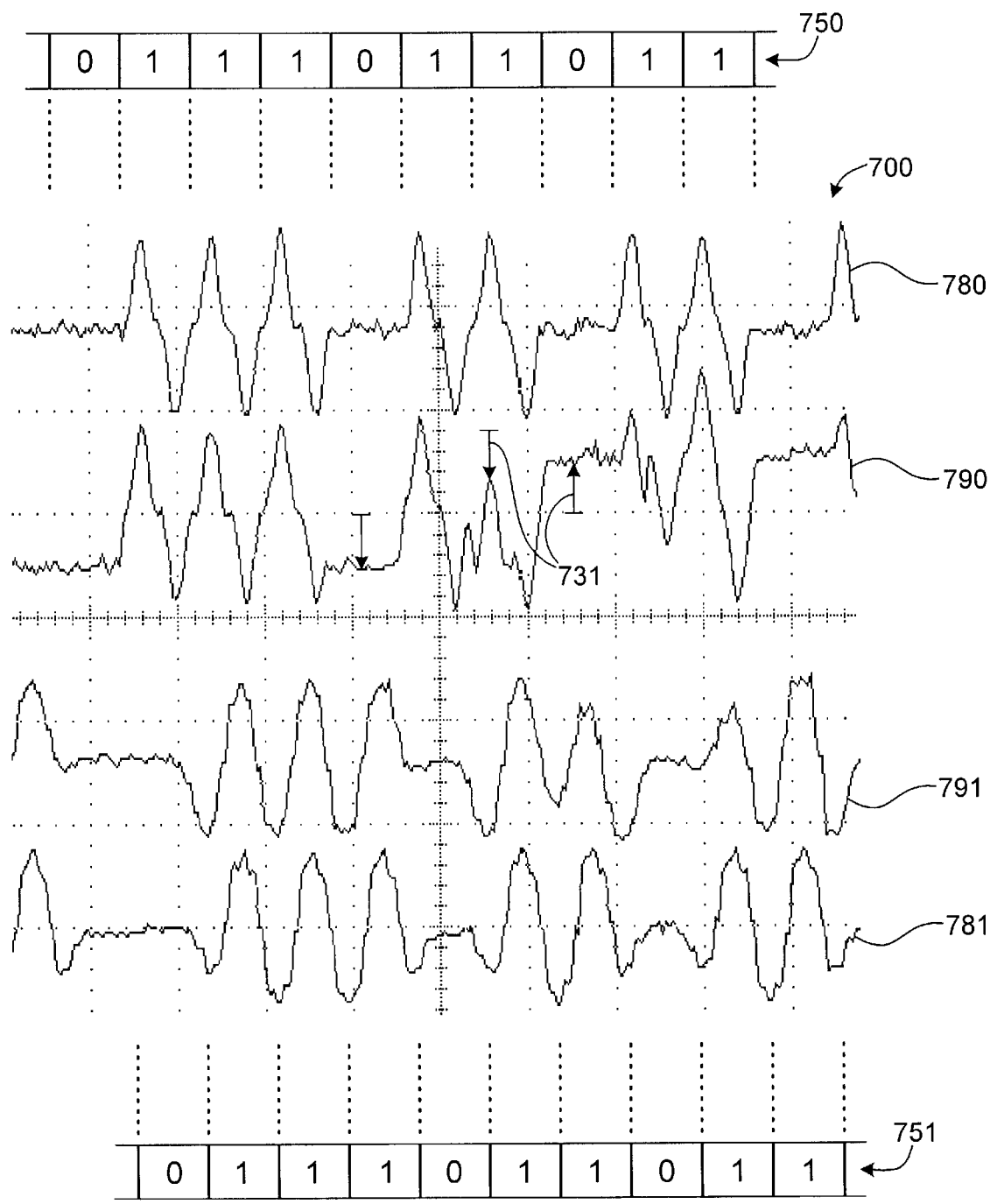
FIG. 7 shows an oscilloscope frame with signals like those of FIG. 6, to illustrate how well the analog filter blocks noise induced by a head instability.

FIG. 7 includes an oscilloscope frame 700 to illustrate how well the analog filter blocks noise induced by a magneto-resistive head instability or similar electrical or magnetic disturbance in a mass storage system. Entering signal 780 contains a bit stream 750 that is visually apparent and readily decodable by conventional means. Entering signal 790 contains the same bit stream 750, but that fact is visually less apparent and not easily decodable because of the presence of noise (depicted as displacements 731) caused by head instability. Filtered signal 781 and 791 (derived from 780 and 790, respectively) differ slightly from each other, but the difference is not sufficient to cause the Viterbi detector or digital matched filter located after the sampler to err. Note that the filtered signals 781,791 are delayed from the entering signals 780,790 from which they are derived. This is due to delays in the differentiator (which effectively delays about 90°) and other circuitry. Bit stream 751 associated with the filtered signals 781,791 also reflects this delay.

Figure 8:
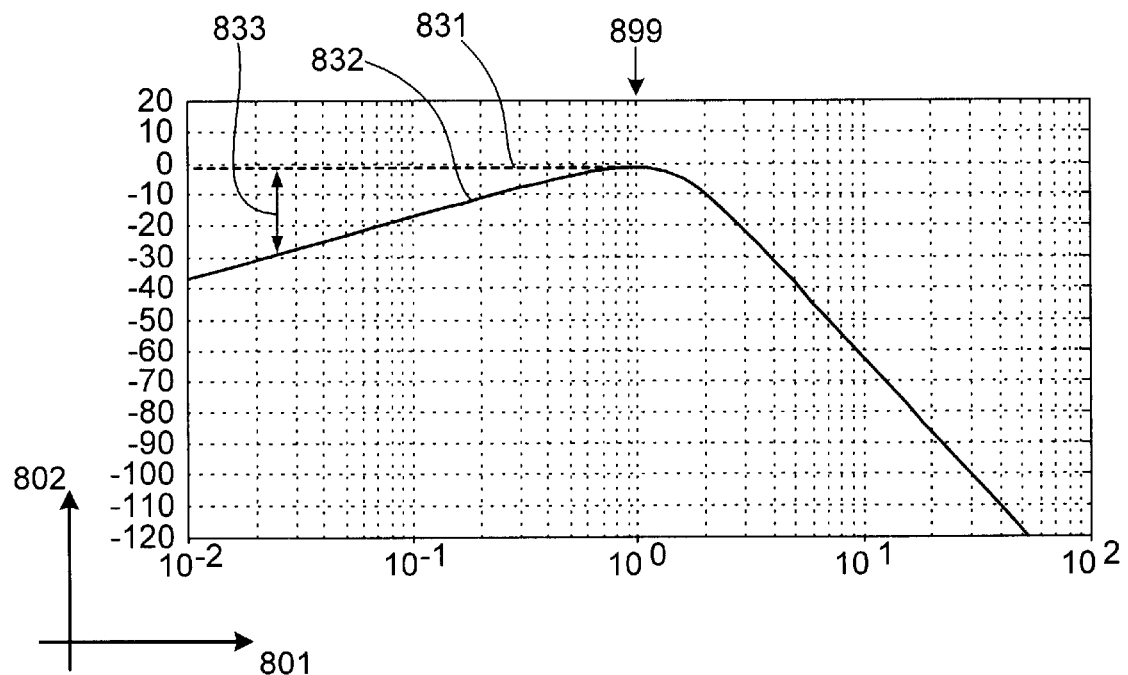
FIG. 8 shows a plot comparing the frequency response of a conventional continuous time filter with the frequency response of a filter of the preferred embodiment.
Figure 9:
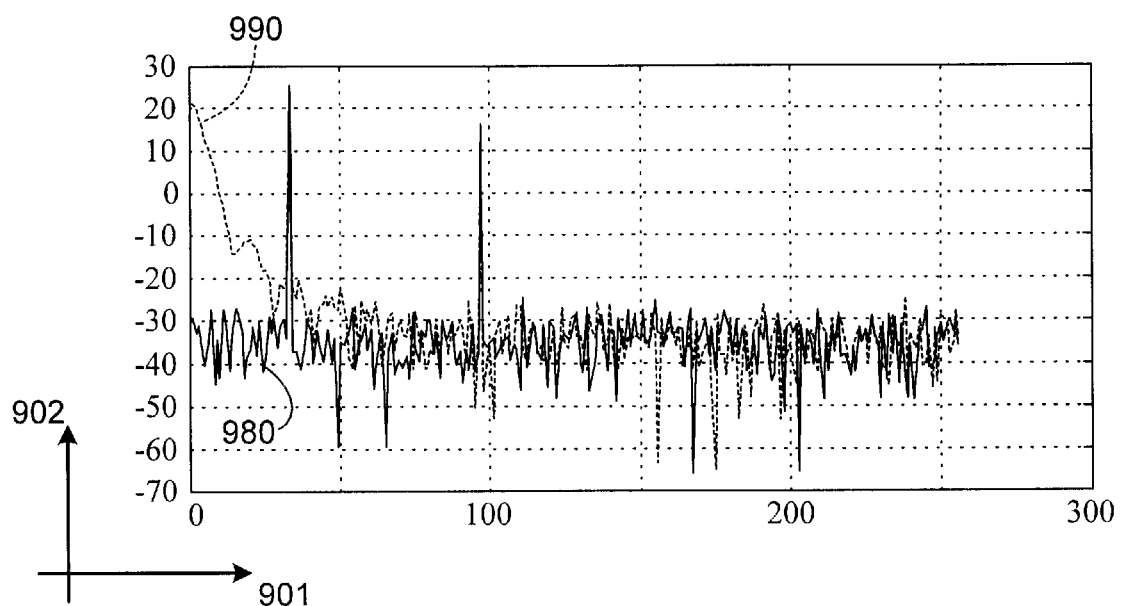
FIG. 9 plots spectral energy vs. frequency for two gain-normalized signals before the filtering of the present invention, one of which reflects a thermal asperity.

FIG. 8 shows a plot comparing the frequency response of a conventional continuous time filter 831 with the frequency response of a filter of the preferred embodiment 832. Each plots relative amplitude in decibels 802 against normalized frequency 801. (The frequency is "normalized" by dividing by the fundamental servo frequency.) The noise limiting effect is indicated by the magnitude response reduction 833 in the frequencies below the servo fundamental frequency 899. The area between the conventional response 831 and the improved response 832 illustrates the magnitude of the decrease in noise entering the channel. FIG. 9 plots spectral energy 902 (in decibels) as a function of frequency 901 (in megahertz) for two gain-normalized signals 980,990 before the filtering of the present invention. Energy plot 980 reflects a signal like signal 580 of FIG. 5, a normal signal in the absence of a thermal asperity. Energy plot 990 reflects a signal like signal 690 of FIG. 6, indicating a thermal asperity. Both plots contain very little useful information in the energy at frequencies substantially less than the servo fundamental frequency of 30 MHz. Most of the energy attributable to the thermal asperity in plot 990 below the servo fundamental frequency, however. This is also true of most of the classic head instabilities (baseline pops, 'sticky' domains, etc). Filters of the present invention effectively block noise from these sources while passing the servo information located at the servo fundamental frequency. Alternatively characterized, a preferred embodiment of the present invention is a method of determining a transducer head position in a mass storage system (such as 300). It includes receiving a position-indicative signal (such as 580, 690,780,790) characterized by a fundamental frequency F (such as 899) from a data path including the transducer head. The signal is high-pass filtered (such as in step 450), significantly attenuating all frequencies in the signal smaller than F/10. After digitization (such as in step 460), a sequence of bits indicative of the transducer head position is detected (such as in steps 470,480,485).

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are largely directed to magnetic disc drives, it will be appreciated by those skilled in the art that the teachings of the present invention can be applied to tape drives, magneto-optic disc drives and the like without departing from the scope and spirit of the present invention.

What is claimed is:

1. A method of determining a transducer head position in a mass storage system comprising steps of:
   (a) receiving a position-indicative signal characterized by a fundamental frequency F from a data path including the transducer head;
   (b) high-pass filtering the position-indicative signal by attenuating the signal at all frequencies smaller than F/10 by at least several decibels;
   (c) digitizing the position-indicative signal; and
   (d) detecting a sequence of bits indicative of the transducer head position in the digitized, high-pass-filtered signal.

2. The method of claim 1 in which the receiving step (a) includes steps of:
   (a1) updating a gain value based upon a sensed magnitude of the position-indicative signal; and
   (a2) normalizing the position-indicative signal with the updated gain value.

3. The method of claim 1 in which the detecting step (d) includes a step (d1) of attenuating the position-indicative signal at all frequencies larger than 2F by at least several decibels.

4. The method of claim 1 in which the detecting step (d) is performed by a Viterbi sequence detector.

5. The method of claim 1 in which the digitizing step (c) includes a step (c1) of generating a series of samples from the position-indicative signal at a sampling frequency larger than 2F.

6. The method of claim 5 in which the detecting step (d) includes steps of:
   (d1) arithmetically combining successive ones of the digitized samples to generate a series of combination values; and
   (d2) generating the series of bits by comparing each of the combination values in the series against a threshold.

7. The method of claim 6 further comprising a step (e) of generating a trigger signal indicative of whether the detected series of bits contains a predetermined "servo address mark" bit sequence.

8. The method of claim 1 further comprising a step (e) of generating a trigger signal indicative of whether the detected series of bits contains a predetermined "servo address mark" bit sequence.

9. The method of claim 8 in which the receiving step (a) includes steps of:
   (a1) updating a gain value based upon a sensed magnitude of the position-indicative signal; and
   (a2) normalizing the position-indicative signal with the updated gain value.

10. The method of claim 8 in which the detecting step (d) includes a step (d1) of attenuating the position-indicative signal at all frequencies larger than 2F by at least several decibels.

11. The method of claim 8 in which the detecting step (d) is performed by a Viterbi sequence detector.

12. The method of claim 1 in which the receiving step (a) includes a step (a1) of injecting low frequency noise into the position-indicative signal by encountering a noise source selected from the group consisting of a thermal asperity and a head instability.

13. The method of claim 12 in which the position-indicative signal includes a series of signal segments each of which undergo the filtering step (b) before undergoing the digitizing step (c).

14. The method of claim 12 in which the filtering step (b) is performed by differentiating the position-indicative signal.

15. The method of claim 12 further comprising a step (e) of generating a trigger signal indicative of whether the detected series of bits contains a predetermined "servo address mark" bit sequence.

16. The method of claim 12 further comprising a step (e) of deriving a track number from the sequence of bits.

17. The method of claim 1 in which the position-indicative signal includes a series of signal segments each of which undergo the filtering step (b) before undergoing the digitizing step (c).

18. The method of claim 17 in which the filtering step (b) is performed by differentiating the position-indicative signal.

19. The method of claim 17 further comprising a step (e) of generating a trigger signal indicative of whether the detected series of bits contains a predetermined "servo address mark" bit sequence.

20. The method of claim 17 further comprising a step (e) of deriving a track number from the sequence of bits.

21. The method of claim 1 in which the filtering step (b) includes a step of differentiating the position-indicative signal.

22. The method of claim 21 further comprising a step (e) of generating a trigger signal indicative of whether the detected series of bits contains a predetermined "servo address mark" bit sequence.

23. The method of claim 21 further comprising a step (e) of deriving a track number from the sequence of bits.

24. The method of claim 1 in which the filtering step (b) is performed by differentiating the position-indicative signal.

25. The method of claim 24 further comprising a step (e) of generating a trigger signal indicative of whether the detected series of bits contains a predetermined "servo address mark" bit sequence.

26. The method of claim 1 further comprising a step (e) of deriving a track number from the sequence of bits.

27. The method of claim 1 in which the detecting step (d) includes a step (d1) of deriving a position error value from the series of digitized samples.

* * * * *